United States Patent [19]
Cotta et al.

[11] 3,853,991
[45] Dec. 10, 1974

[54] ANTIBIOTIC AXENOMYCINE AND METHOD FOR THE PREPARATION THEREOF

[75] Inventors: Ernesto Cotta; Piera Julita; Aurora Sanfilippo, all of Midland, Italy

[73] Assignee: Societa' Farmaceutici Italia S.p.A., Milan, Italy

[22] Filed: Sept. 24, 1971

[21] Appl. No.: 183,671

Related U.S. Application Data

[63] Continuation-in-part of Ser. Nos. 832,448, June 11, 1969, abandoned, and Ser. No. 134,477, April 15, 1971, abandoned.

[30] Foreign Application Priority Data
June 11, 1968  Italy .................................. 17570/68
May 4, 1970  Italy .................................. 24144/70

[52] U.S. Cl..................... 424/121, 424/122, 195/80
[51] Int. Cl............................................ A61k 21/00
[58] Field of Search .............. 424/121, 122; 195/80

[56] References Cited
OTHER PUBLICATIONS

R. Derwent Farm Doc. No. 41590, Abstracting N.E. 69,08269, Published 12-15-1969.

*Primary Examiner*—Jerome D. Goldberg
*Attorney, Agent, or Firm*—Hubbell, Cohen & Stiefel

[57] ABSTRACT

A microbiological process for the preparation of the antibiotic complex axenomycine and its salts with non-toxic acids consisting of the substances axenomycine A and axenomycine B by cultivating the microorganism *Streptomyces lisandri n.sp.* Axenomycine D is obtained by growing the microorganism in a nutrient medium containing a source of carbon, nitrogen and mineral salts, subjecting the culture to a high stirring and to a high air flux, at a temperature of from 23° to 37°C for a period of from 60 – 160 hours and at a pH of 6 – 9 and thereafter isolating axenomycine D from the culture broth.

5 Claims, No Drawings

ANTIBIOTIC AXENOMYCINE AND METHOD FOR THE PREPARATION THEREOF

The present application is a continuation-in-part of applications Ser. No. 832,448 filed June 11, 1969 and Ser. No. 134,477 filed Apr. 15, 1971 and combines the subject matter of both applications, which are both now abandoned.

This invention relates to an antibiotic complex and the preparation thereof. More particularly, this invention relates to the antibiotic complex axenomycine, also called F.I. 2604, and which is constituted by the substances axenomycine A, also called F.I. 2604A, and axenomycine B, also called F.I. 2604B, and their salts. The antibiotics are prepared by culturing *Streptomyces lisandri n.s.p.*. The antibiotic substances axenomycine A and axenomycine B show a high pharmacological activity and they are particularly useful as antihelminthic, antiprotozoal and antifungal agents.

The strain *Streptomyces lisandri n.sp.* also called *Streptomyces F.I.* 2604 (number of the strain collection of the Societa Farmaceutici Italia), which produces the antibiotic complex has been isolated from a soil sample taken in Lisandro Olmos (Argentine). It has been filed at the Institute of Plant Pathology of the University of Milan, Italy, without reservation, receiving the index number I.P.V. 1951, at the Rutgers University, New Brunswick, N.J. (U.S.A.) without reservation, receiving the number I.M.R.U. 3935 and at the Commonwealth Mycological Institute, Ferry Lane, Kew, Surrey (England) receiving the number I.M.I. 137178, and it shows the following characteristics. The microorganism will be maintained at Rutgers University for the life of the patent issuing on this application.

Microscopic properties:

On the usual cultural media, the vegetative mycelium consists of hyphae, more or less thin of $0.5 - 0.9$ $\mu$ thickness, long and abundantly branched, which form long and straight conidiophores of $1.1 - 1.3$ $\mu$ thickness. These branch out as monopodially branching hyphae, which form spores of normal length and tightly spiralled at their distal portion. These hyphae can be inserted oppositely or alternatively on conidiophores and when mature change into chains of spores or conidia. The latter have a smooth surface and oval form and have the following size: $0.9 - 1.2 \times 1 - 1.4$ $\mu$.

Macroscopic properties:

Table 1 reports the cultural properties obtained on different media, culturing the microorganism at 28°C and carrying out the observations at the 3rd, 8th, 15th, 20th and 30th day after inoculation. The microorganism substantially shows a quick and abundant growth with the formation of a compact solid, vegetative mycelium, with a patina which is smooth on synthetic media and slightly folded on the organic media. On synthetic media, the vegetative mycelium is colorless while its back side can assume tonalities of various colors according to the culture medium, that is, from straw-yellow to deep-yellow to chestnut-brown or gray with violet, vinaceous-pink, dark-green tonalities. On organic media, the vegetative mycelium has a honey color and its back side is less variable and shows a lemon-yellow or ochre-yellow color, which aging changes to more or less light chestnut-brown. The aerial mycelium is abundant on the synthetic media and is rather scarce on organic media. On the former, the prevalent color is white which on some media can assume vinaceous-pink tonalities or beige-ivory and also brown-light gray. On organic media, it is clear white or dirty white, sometimes with brown-light gray tonalities. The aspect is from cottony to dusty according to the cultural medium.

Table 1

Cultural Properties of *Streptomyces lisandri*

| Medium | Growth | Aerial Mycelium | Vegetative Mycelium | Soluble Pigment |
|---|---|---|---|---|
| Bennet's Agar (1) | abundant; in slightly folded patina | abundant; slightly cottony, white with pink-beige shades | honey; the back side has a color from light ochre to light chestnut-brown | light tea color |
| Czapeck's Agar (1) | scarce | abundant; rather cottony, white | colorless; back side is first straw-yellow then has more or less deep violet-gray tonalities | light violet with brownish shades |
| Asparagine glucose Agar (1) | abundant, in smooth patina | discrete, rather flat, whitish colored with pink shades | colorless; back side is first lemon-yellow then vinaceous pink | light vinaceous |
| Glycerine—glycine Agar (1) | discrete, in smooth patina | very abundant; cottony white colored with some beige tonalities | colorless; back side is from straw-yellow to brown-ochre | absent |
| Emerson's Agar (1) | abundant, in slightly folded patina | scarce, whitish flat | honey; back side is deep ochre | light tea color |

Table 1 — Continued

Cultural Properties of *Streptomyces lisandri*

| Medium | Growth | Aerial Mycelium | Vegetative Mycelium | Soluble Pigment |
|---|---|---|---|---|
| Starch Agar and salts (2) | discrete, in smooth patina | very abundant, flat, brown-light beige | colorless; back side turns from light-yellow to brown to gray | light yellow |
| Potato Agar (4) | abundant, in slightly smooth patina | discrete, rather flat, whitish with brownish-beige tonalities | from straw-yellow to lemon; back side assumes then a chest-nut-brown color | tea color |
| Oats Agar (3) | very scarce and slowly in smooth patina | abundant, flat from white to brown light-gray colored | colorless; back side is first lemon-yellow then light-brown | absent |
| Glycerine—asparagine Agar (1) | scarce, in smooth patina | very abundant, flat white with beige tonalities | straw-yellow; back side turns from orange-ochre to brown | light yellow brown |
| Yeast-extracts glucose Agar (1) | abundant, in slightly folded patina | abundant, rather flat, white | straw-yellow back side is light-ochre | absent |
| Peptone—starch Agar (1) | abundant, in smooth patina | abundant, rather flat, white | honey to lemon-yellow; back side is brown-ochre with pink tonalities | light tea color |
| Peptone Agar $KNO_3$(1) | discrete, in smooth patina | abundant, slightly cottony, white | colorless, back side straw-yellow | absent |

1) Waksman S.A.: "The Actinomycetes" Vol. II, The William and Wilkins Co. 1961, p. 328–334.
2) Pridham T.G., Anderson P., Foley C., Lindenfelser L.A., Hesseltine G.M. and Benedict R.B.: "Antibiotics Annual", 1956–1957, p. 947–953.
3) Baldacci E., Giolitti G., Kuster E. and Scotti T.: Journal or Microbiology, 9, p. 39 (1961).
4) Grein A., Spalla C., and Cotta E.: Journal of Microbiology, 13, 299 (1965).

| Biochemical properties | |
|---|---|
| Gelatin | : total proteolysis |
| Nitrates | : are not reduced to nitrites |
| Starch | : total hydrolysis |
| Milk | : is not coagulated, but completely peptonized |
| Melanoid pigments | : no production |
| Tyrosine | : is decomposed |
| $H_2S$ | : no production |

On agar medium, the microorganism produces a soluble pigment which, on synthetic media is light vinaceous-pink or light brown-yellow, while on organic media it is light tea colored. The microorganism utilizes for growth the following carbon sources: glucose, l-arabinose, saccharose, d-xylose, meso-inositol, d-mannitol, d-fructose, maltose and raffinose. It does not utilize ramnose. The microorganism does not grow at 50°C and does not produce sclerotia. In submerged stirred liquid culture, the microorganism produces the antibiotics which form the complex axenomycine.

Identification of the microorganism

The properties shown by the microorganism under examination and previously described relate it to the genus *Streptomyces* Waksman et Henrici (Bergey's Manual of Determinative Bacteriology, 7th Ed., 1957, p. 744–745). The strain belongs to the Section "Spira," Series "White" of Pridham, et al., (Appl. Microbiol. 6, 1958, p.52), to the Section II, Series "Albidoflavus" of Baldacci (Journ. Microbiol. 6, 1958, p.10), to the series "Albus" of Waksman (The Actinomycetes, Vol. II, p.117, 1961) and then to the group of streptomycetes having the "niveus" aerial mycelium of Hutter (Systematik der Streptomyceten, Bibl. Microbiol. Fasc. 6, S. Karger, Basel, 1967, p. 256). A comparison between the properties of the microorganism under examination and those of the species belonging to the cited subgeneric systematic groups (Taxa), has shown that none of them has all the properties corresponding to those of the microorganisms under examination. For the above-mentioned reasons and particularly because the microorganism produces, especially on synthetic media, a soluble pigment variable from pink to reddish, to violet-vinaceous, to lemon-yellow which was not found in the descriptions of any of the microorganism species belonging to the cited subgeneric taxa, further because it produces the antibiotic complex axenomycine, it is considered a new species and is named *Streptomyces lisandri* n.sp.

The microorganism *Streptomyces lisandri* n.sp. may be stored by subsequent transfers on solid medium and by lyophilization of a suspension of its spores in a suitable vehicle.

The microbiological process for the preparation of the antibiotic complex axenomycine consists in culturing the microorganism *Streptomyces lisandri* n.sp. in a cultural medium containing carbon, nitrogen sources and mineral salts, extracting the antibiotic, and successive separation and characterization of the substances which constitute it. More particularly, the microorganism, is cultured in a liquid cultural medium under aerobic conditions at from 23° to 37°C, preferably at 28°C, for a period of from 60 to 160 hours. The pH may vary, according to the fermentation media used, from 6 to 9.

As a carbon source, glucose, starch, dextrine, different meals (e.g. soya, maize, wheat, etc.), corn steep liquor and other substances of common use may be used. The nitrogen source, besides the above-mentioned complex substances containing nitrogen, may be casein, casein hydrolyzates, cotton-seed meal and ammonium salts such as sulphates, phosphates, chlorides and other substances in common use. The mineral salts useful in the production of the antibiotic may vary according to the cultural medium employed. Calcium carbonate is nearly always present adn the chlorides, sulphates, phosphates etc., of sodium potassium, magnesium, iron, copper, zinc, manganese and cobalt may be added.

The fermentation may be carried out in Erlenmeyer flasks and in laboratory or industrial fermenters of various capacities. When the fermentation is complete, the antibiotic complex is extracted from the cultural broth with suitable solvents and separated by absorption over a chromatographic column into the antibiotic substances which constitute it. The determination of the concentration of the antibiotic complex in the cultural medium is carried out during the period of growth of the microorganism by testing samples obtained by extracting the humid mycelium with ethyl alcohol. After evaporation of the solvent under vacuum, the residue is taken up with the minimum volume of a suitable solvent (ethyl alcohol, methyl alcohol, dimethylformamide) and then diluted with water. Such samples are tested on organisms sensible to the antibiotic complex, for example *Rhabditis macrocerca* and *Saccharomyces carlsbergensis*, preparing a series of dilutions of the samples under examination and comparing them to solutions of the antibiotic complex having known titer. In analogous manner, the samples obtained from successive purifications may be titrated.

Chemical-physical properties

The antibiotic complex axenomycine consists of two substances having similar chemical-physical characteristics. These substances have been named axenomycine A and axenomycine B and they exist in the form of amorphous yellowish-white products, are insoluble in benzene and petroleum ether, and sparingly soluble in water, ethyl acetate, acetone, chloroform. They are soluble in ethyl, methyl and propyl alcohols, reduce Fehlings solution, ammoniacal silver nitrate, and give positive reaction with tetrazole blue. The Molish reaction is weakly positive. On paper, the aniline phthalate reaction for aldoses and the naphthoresorcinol reaction for ketoses are negative. The reaction with ferric chloride is negative. The antibiotic axenomycine A has given the following elemental analysis: 61.7% C, 8.52% H, 28.7% O. The molecular weight is 1451.3. The compound melts from 127° to 142°C forming a transparent brick-red gel. $[\alpha]_D^{23°} = +10.5°$ (c = 0.9 in methanol). Rf = 0.49 over silica gel buffered at pH 7 (n.butanol : acetic acid : water :: 4 : 0.5 : 1).

The U.V. spectra in methanol give absorption maxima at the following wave lengths: 249, 254 and 330 m$\mu$ and a shoulder at 265–268 m$\mu$. The I.R. spectrum in KBr shows bands at the following wave lengths (in $\mu$): 2.94 – 3.44 – 5.78 – 6.00 – 6.16 – 6.24 – 6.88 – 7.25 – 7.41 – 8.61 – 8.85 – 9.35 – 10.00 – 10.40 – 10.95 – 11.8 – 12.5.

The antibiotic axenomycine B has given the following elemental analysis: 62.8% C, 8.58% H, 27.8% O. The molecular weight is 1330.2. The compound melts from 122° to 140°C. $[\alpha]_D^{23°} = +5°$ (c = 0.9 in methanol). Rf = 0.61 on silica gel buffered at pH 7 (n.butanol : acetic acid : water :: 4 : 0.5 : 1).

The U.V. spectra in methanol give absorption maxima at the following wave lengths: 249, 254 and 330 m$\mu$ and a shoulder at 265–268 m$\mu$. The I.R. spectrum in KBr shows bands at the following wave lengths (in $\mu$): 2.94 – 3.40 – 5.82 – 6.00 – 6.16 – 6.24 – 6.86 – 7.25 – 7.41 – 8.60 – 8.85 – 9.35 – 10.00 – 10.40 – 10.98 – 11.8 – 12.5.

It has also been found that by submerged aerobic cultures of *Streptomyces lisandri n.sp.* at different and new conditions results in a new antibiotic called axenomycine D which has a high therapeutic activity.

This latter process consists in fermenting the microorganism *Streptomyces lisandri n.sp.* in a cultural medium containing a source of carbon, nitrogen and mineral salts. To obtain axenomycine D at high yields, the carbon content in the production medium must be equal to or greater than 10% and furthermore the stirring and air supplying conditions must be such as to assure at any moment a satisfactory quantity of oxygen in the culture. More particularly, the "optimum" stirring conditions correspond to an adsorbed power of from 2 to 4 W/l (watts/liter) and an air flux between 0.7 and 2 liters per liter of medium per minute.

As a carbon source, starch, glucose dextrine, molasses may be employed; as a nitrogen source, corn steep liquor soya meal, peanut meal, meat extracts, peptone, casein, casein hydrolysates may be employed. The mineral salts useful are: calcium carbonate, sodium, potassium, magnesium, iron, copper, zinc, manganese and cobalt chloride. The phosphates have not been proved suitable, in fact, it has been found that by increasing their concentration in the productive medium, the yield of antibiotic decreases.

The operation is performed at a temperature of from 23° to 37°C for a period of 60 – 160 hours and at a pH of 6 – 9. The fermentation may be carried out in Erlenmeyer flasks or in laboratory or industrial fermenters of various capacities. When fermentation is over, axenomycine D is isolated from the mycelium, separated from the fermentation broth by extraction with suitable solvents and purified by chromatography in a known manner.

Axenomycine D is soluble in alcohols, insoluble in water and benzene, has a molecular weight of 1,650 melts at 174 – 175°C with decomposition; $[\alpha]_D^{22} = +11$ (c = 0.5 methanol); Rf – 0.35 over silicagel (ethyl acetate – isopropanol water 100:35:5). The U.V. spectrum in methanol has maxima at 250, 255 and 330 $\mu$m and shoulders at 265 – 268 $\mu$m, $E_{1\ cm}^{1\%}$ 138 (255 $\mu$m).

The I.R. spectrum in KBr shows bands at 3,440, 2,980, 2,950, 2,890, 1,735, 1,705, 1,675, 1,630, 1,610, 1,465, 1,385, 1,355, 1,290, 1,265, 1,195, 1,170, 1,115, 1,080, 1,050, 1,005, 995, 975, 945, 925, 895, 865, 810, 700 cm$^{-1}$. The elemental analysis gives the following values: C 60.25% H 7.92% O 30.35%. The antibiotic axenomycine D of the present invention has a high antihelminthic, antiprotozoal and antifungal activity.

Antihelminthic activity:

The antihelminthic activity has been tested in vitro on different helminthes, by different modalities.

*Rhabditis macrocerca*, kept in laboratory on a culture, has been cultivated in agar with yeast extract treated with the antibiotic in various concentrations. After suitable incubation, the DIM (Minimum Inhibiting Dose) of the antibiotic which totally inhibits the development of the tested organism, has been determined.

*Syphacia obvelata* and *Hymenolepis nana*, taken from experimentally infested mice, have been immersed in saline solutions buffered at pH 7.5 and the antibiotic was added at different concentrations. The survival of the two helminthes was tested at different contact periods and the DImM (Minimum Immobilizing Dose), which represents the smallest quantity of the substance able to immobilize "in vitro" the movements of the tested organism, was determined.

Table 2 reports the data referred to the Minimum Inhibiting Dose and to the Minimum Immobilizing Dose, after 4 hours contact.

TABLE 2

| Tested species | Axenomycine A | | Axenomycine B | |
| --- | --- | --- | --- | --- |
| | DIM/μg/cc | DImM/μg/cc | DIM/μg/cc | DImM/μg/cc |
| *Rhabditis macrocerca* | 10 | | 10 | |
| *Syphacia obvelata* | | 1000 | | 1000 |
| *Hymenolepis nana* | | 0.5 | | 0.5 |

The antihelminthic activity in vivo has been tested on albino mice of 25 g weight, experimentally infested with *Hymenolepis nana*. The tests have been carried out on groups of 10 mice each. Results show that 100% of the animals with parasites are cured by administration of the antibiotics either axenomycine A or axenomycine B at a single dose by oral route. This dose or therapeutic dose corresponds to 10 mg/kg and it is clearly lower than that allowed by the toxicity data.

Table 3 reports the acute toxicity data in mice.

TABLE 3

| | DL 50 mg/kg | |
| --- | --- | --- |
| Administration route | Axenomycine A | Axenomycine B |
| Oral | 200 | 300 |
| Intraperitoneal | 3.7 | 10 |

Antiprotozoal activity

The antiprotozoal activity has been tested in vitro on *Entamoeba histolytica* strain F 22 in Pavlova monophasic medium and on *Trichomonas foetus* in biphasic medium with coagulated eggLocke saline solution horse serum. After incubation at 37°C for 48 hours, the Minimum Inhibiting Dose (DIM) has been determined by counting, under the microscope, the existing protozoae.

Table 4 reports the antiprotozoal activity data experimentally obtained in vitro.

TABLE 4

| Tested species | DIM μg/cc | |
| --- | --- | --- |
| | Axenomycin A | Axenomycine B |
| *Trichomonas foetus* | 0.1 | 0.1 |
| *Entamoeba histolytica* | 1.5 | 3 |

Antifungal activity

The antifungal activity has been tested in vitro on *Saccharomyces carlsbergensis* and *Candida albicans* in Sabouraud medium.

After incubation at 30°C for 48 hours, the Minimum Inhibiting Dose (DIM) has been determined. The data obtained are reported in Table 5.

TABLE 5

| Tested species | DIM μg/cc | |
| --- | --- | --- |
| | Axenomycine A | Axenomycine B |
| *Saccharomyces carlsbergensis* | 0.04 | 0.04 |
| *Candida albicans* | 1.25 | 1.25 |

The antihelminthic activity of axenomycine D has been tested on mice, experimentally infected with *Hymenolepis nana*, on groups of 10 animals each. Axenoncyine D has been administered by oral route, between the 12th and the 20th day of the infection. Table 6 reports the percentage of the cured animals.

TABLE 6

| COMPOUND | DOSE mg/kg | % RECOVERY |
| --- | --- | --- |
| Axenomycine D | 2.5 | 65.0 |
| Axenomycine D | 5.0 | 100.0 |

The acute toxicity of Axenomycine D, expressed as $LD_{50}$, in the mouse, is 200 mg/kg by oral route.

The following examples serve to illustrate the invention, without limiting it.

EXAMPLE 1

Two 300 cc Erlenmeyer flasks each containing 60 cc of the following medium were prepared:

| Dextrine | 3% |
| --- | --- |
| Casein | 0.5% |
| Calcium carbonate | 0.4% |
| Ammonium sulphate | 0.1% |
| Corn step liquor | 1% |
| Tap water to | 100% |

Sterilization was performed by heating in an autoclave at 120°C for 20 minutes. The pH of the medium after sterilization varied from 6.8 to 7. Each flask was inoculated with 0.5 cc of a spore suspension obtained by washing, with 4 cc of sterile distilled water, the patina of a slant culture of *Streptomyces lisandri* 15 days old developed on glucose potato agar. The flasks were incubated at 28°C for 48 hours on a rotary shaker with a stroke of 3 cm at 225 r.p.m. Thereafter 2 cc of this culture were used to inoculate other 300 cc flasks each containing 60 cc of the following productive medium:

| | |
|---|---|
| Starch | 4.5% |
| Soya meal | 2.2% |
| Corn steep liquor | 2.3% |
| Calcium carbonate | 0.4% |
| Sodium chloride | 0.5% |
| Tap water to | 100% |

The sterilization was carried out by heating at 120°C for 20 minutes. The culture was incubated at 28°C as previously described for the vegetative culture. After 120 hours of incuation, a production of 50 μg per cc of culture broth of the antibiotic complex was obtained.

EXAMPLE 2

The vegetative phase was carried out as in Example 1. The productive phase was cultured on the following medium:

| | |
|---|---|
| Soluble starch | 8% |
| Cotton-seed meal | 4% |
| Corn steep liquor | 2.5% |
| Oil bacon-fat | 1.5% |
| Calcium carbonate | 1% |
| Ammonium sulphate | 1% |
| Manganous sulphate | 0.01% |
| Cobalt sulphate | 0.0007% |
| Tap water to | 100% |

The pH was adjusted to 6.2 with 4N sodium hydroxide solution. The sterilization was carried out heating at 120°C for 20 minutes. The culture was incubated at 28°C under the stirring conditions already described in Example 1. After 120 hours of incubation, a production of 70 μg per cc of culture broth of the complex was obtained.

EXAMPLE 3

Two 300 cc Erlenmeyer flasks each containing 60 cc of the following medium were prepared:

| | |
|---|---|
| Dextrin | 5% |
| Calcium carbonate | 0.5% |
| Corn steep liquor | 1% |
| Casein | 1% |
| Ammonium sulphate | 0.2% |
| Potassium monophosphate | 0.01% |
| Tap water to | 100% |

Sterilization was carried out heating at 120°C for 20 minutes. The pH of the medium after sterilization varied from 6.7 to 7. Each flask was inoculated with 1 cc of a spore suspension obtained by washing, with 5 cc of sterile distilled water, the patina of a slant culture of *Streptomyces lisandri* 15 days old, developed on glucosate potato agar. The flasks were incubated at 28°C for 48 hours, under the same condition of stirring as described in Examples 1 and 2, 2 cc of a culture thus obtained were used to inoculate other 300 cc flasks each containing 60 cc of a productive medium of the following composition:

| | |
|---|---|
| Glucose | 6% |
| Soya meal | 3% |
| Corn steep liquor | 2% |
| Calcium carbonate | 1% |
| Sodium chloride | 0.3% |
| Soya oil | 0.05% |
| Tap water to | 100% |

The sterilization was carried out at 120°C for 20 minutes. The pH after sterilization varied from 6.2 to 6.8. The flasks were incubated at 28°C under the same conditions of stirring as described in Exapmles 1 and 2. After 120 hours of incubation, a production of 120 μg per cc of the complex was obtained.

EXAMPLE 4

A 2,000 cc flask provided with three breakwater devices and a side-inoculation-neck, containing 500 cc of the medium described in Example 3 for the vegetative phase, was sterilized by heating at 120°C for 20 minutes. After cooling, the flask was inoculated with all the spore suspension obtained by washing with distilled water the patina of 4 slants cultivated on glucose potato agar for 15 days. The flask was then incubated at 28°C on a rotary shaker at 120 r.p.m. with a stroke of 4.5 cm for 48 hours.

50 cc of the vegetative culture so obtained were employed for inoculating, in a 5 liter glass fermenter, 3 liters of a medium previously sterilized at 120°C for 30 minutes the composition of which was as follows:

| | |
|---|---|
| Dextrin | 4% |
| Casein | 1% |
| Corn steep liquor | 1% |
| Calcium carbonate | 0.50% |
| Ammonium sulphate | 0.1% |
| Monopotassium phosphate | 0.01% |
| Tap water to | 100% |

The broth was stirred at 400 r.p.m. and aerated with about 1 volume of air per volume of medium per minute, and incubated at a temperature of 27°–28°C for about 24 hours. At the end of this period, 3 liters of the mycelial suspension obtained were used to inoculate 50 l of the fermentation medium. The fermentation medium had the following composition:

| | |
|---|---|
| Glucose | 8% |
| Soya meal | 3% |
| Corn steep liquor | 2% |
| Calcium carbonate | 1% |
| Sodium chloride | 0.25% |
| Soya oil | 0.5% |
| Tap water to | 100% |

After sterilization at 121°C for 30 minutes and after inoculation, the medium was shaken at 200 r.p.m. by a turbine-disc propeller with 4 flat blades and aerated with 0.7 liters of air per liter of medium per minute, at 27°–28°C for 120 hours. The mycelium collected by filtration of 5 liters of culture broth was extracted 4 times with 3 liters of methanol each time. The extracts collected together were concentrated under reduced pressure and the aqueous residue washed with petroleum ether, then extracted four times with an equal volume of normal butyl alcohol. The extracts collected and evaporated to dryness under vacuum left a residue wich was taken up with 100 cc of methyl alcohol. The insoluble part was discarded and the solution evaporated. The residue was suspended in 200 cc of chloroform and then filtered. The chloroform solution, concentrated and precipitated with petroleum ether, gave 2.0 g of a crude product containing the antibiotic axenomycine A and axenomycine B. The crude product was purified by countercurrent distribution with a two-phasic system, chloroform : carbon tetrachloride : methanol : water (3 : 2 : 4 : 1). Fractionating on 50 tubes, the maximum of the activities was obtained in tubes comprised between the 10th and the 20th. 0.20 g of pure axenomycine complex were obtained by evaporating to dryness the contents of these tubes. The complex obtained showed, on plate chromatography, to contain the two components, namely the two antibiotics axenomycine A and B, with Rf 0.49 and 0.61, respectively. The separation of the two active substances was effected by chromatography on silica gel columns buffered at pH 7 with 0.05M phosphate buffer and 33% of cellulose powder added. For 1 g of the antibiotic complex a column with a diameter of 2.4 cm and a height of 30 cm was necessary. By eluting with a mixture of n.butyl alcohol:acetic acid:water(4:0.5:1 in volume) fractions containing 0.60 g of the compound B and successively 0.25 g of the compound A were obtained. Each antibiotic, taken up with methanol after evaporation of the eluates, was recovered by removal of the solvent and dried to constant weight over $P_2O_5$ at 0.2 mm Hg and room temperature.

The non-toxic salts of the antibiotics are obtained by neutralizing the basic antibiotic with a non-toxic acid such as hydrochloric, phosphoric sulfuric and acetic.

The following Examples serve to illustrate the invention, without limiting it as to axenomycine D.

EXAMPLE 1

A 2,000 ml flask, containing 500 cc of cultural medium was sterilized at 120°C for 20 minutes.

The composition of the culture medium for preparing preinoculation was:

| | |
|---|---|
| Dextrin | 4% |
| Calcium carbonate | 0.5% |
| Corn steep liquor | 1.0% |
| Casein | 1.0% |
| Ammonium sulfate | 0.2% |
| Tap water to | 100. |

The flask was inoculated with the spore suspension obtained by washing 4 slants of 15 days old potato-glucose-agar medium. The flask was incubated at 28°C for about 48 hours on a rotary shaker at 120 r.p.m. 50 ml of this culture was used to inoculate a 5 liter glass fermenter containing 3 liters of the medium having a composition equal to the previous one. The culture broth was stirred at 500 r.p.m. by two turbine-disc propellers with curved blades and aerated with an air flux of 0.7 l per liter of medium per minute, for 24 – 28 hours, always at the temperature of 27° – 28°C. 5 liter glass fermenters containing 3 liters of culture medium were inoculated with an amount of culture broth obtained under the above-mentioned conditions, equivalent to 5% of the volume of the productive medium.

The composition of culture medium of the productive phase was:

| | |
|---|---|
| Glucose | 10 and 12% |
| Soya meal | 3.0% |
| Corn steep liquor | 2.0% |
| Calcium carbonate | 1.0% |
| Sodium chloride | 0.25% |
| Soya oil | 0.5% |
| Tap water to | 100. |

The culture broth was stirred at 500 r.p.m. by two turbine-disc propellers with 6 curved blades with an air flux of 1 liter per liter per minute. After 136 hours of fermentation the following yields were obtained:

| Glucose Concentration % | Axenomycine D γ/ml |
|---|---|
| 10 | 1350 |
| 12 | 2050 |

EXAMPLE 2

The fermentation was carried out in 5 liter fermenters under the same cultural and mechanical conditions as reported in Example 1.

To the medium of the productive phase containing 12% of glucose, small quantities of $KH_2PO_4$ had been added. The results obtained are the following:

| $KH_2PO_4$ Concentration % | Axenomycine D γ/ml |
|---|---|
| 0 | 2060 |
| 0.005 | 2040 |
| 0.01 | 1485 |
| 0.05 | 1005 |

EXAMPLE 3

By operating in 5 liter fermenters under the conditions as described in Example 1, with 12% of glucose and at 500 and 650 r.p.m., and with an air flux of 1 l and 1.7 l per liter per minute, the following results were obtained:

| STIRRING R.P.M. | AIR FLUX LITER/LITER/MINUTE | AXENOMYCINE D γ/ml |
|---|---|---|
| 500 | 1.0 | 2410 |
| 500 | 1.7 | 3050 |
| 650 | 1.0 | 3630 |
| 650 | 1.7 | 4100 |

EXAMPLE 4

An 80 liter stainless steel fermenter, containing 50 liters of medium for the inoculum preparation, having a composition equal to that described in Example 1, was inoculated with 500 ml of a culture obtained into a 2,000 ml flask under conditions already described in Example 1. After 24 hours of incubation in a fermenter, under stirring and aeration conditions, a mycelium growth sufficient to inoculate a 500 liter stainless steel fermenter was obtained. The fermenter contained 300 liters of a cultural medium having the following composition of the productive phase:

| | |
|---|---|
| Glucose | 13% |
| Soya meal | 3.0% |
| Corn steep liquor | 2.5% |
| Calcium carbonate | 1.2% |
| Sodium chloride | 0.25% |
| Soya oil | 0.6% |
| Tap water to | 100. |

After 136 hours of incubation at 28°C, under stirring conditions of 250 r.p.m., by two turbine-disc propellers with 8 flat blades (adsorbed power = 2.5 W/liter) and aeration with an air flux of 0.7 liter/liter per minute, with a counterpressure of 1 atmosphere, a fermentation on yield of 3050 γ/ml was obtained. (The term W/liter means that the power operating the stirrer is 2–4

Watts/liter liquid medium.) The mycelium recovered by filtration of 14 l of culture broth was extracted twice under stirring with 4 l of butanol each time. The extracts combined were concentrated to about 300 ml.

The precipitate obtained was recovered by centrifugation, washed with ethyl ether and dried under vacuum.

The crude product so obtained was dissolved in methanol, separated by filtration from the slightly insoluble product, passed through a silicic acid column and eluted with ethyl acetate-methanol-water (125:25:17). During the elution, the samples of the different fractions were analyzed by thin layer chromatography. The first fractions (about 2 l of eluate) were removed. The fractions following contain axenomycine D, which was removed under vacuum by evaporation of the solvent. 7 g of the product were obtained, by crystallization from methanol-isopropanol.

What is claimed is:

1. Antibiotic substance axenomycine A which has the elemental analysis 61.74% C, 8.52% H, 28.87% O, a molecular weight of 1451.3, melts from 127° to 142°C forming a transparent brick-red gel, $[\alpha]_D^{23°} = +10.50°$ (c = 0.9 in methanol), Rf = 0.49 over silica gel buffered at pH 7 (n.butanol:acetic acid:water:4:0.5:1), a U.V. spectra in methanol giving an absorption maxima at the following wave lengths 249, 254 and 330 m$\mu$ and a shoulder at 265 – 268 m$\mu$ and an I.R. spectrum in KBr showing bands at the following wave lengths (in $\mu$) 2.94 – 3.44 – 5.78 – 6.00 – 6.16 – 6.24 – 6.88 – 7.25 – 7.41 – 8.61 – 8.85 – 9.35 – 10.00 – 10.40 – 10.95 – 11.8 – 12.5 or its salts with non-toxic acids.

2. Antibiotic substance axenomycine B which has the elemental analysis 62.8% C, 8.58% H, 27.8% O, a molecular weight of 1,330.2, melts from 122° to 140°C $[\alpha]_D^{23°} = +5°$ (c = 0.9 in methanol); Rf = 0.61 on silica gel buffered at pH 7 (n.butanol acetic acid:water::4:0.5:1), a U.V. spectra in methanol giving an absorption maxima at the following wave lengths 249, 254 and 330 m$\mu$ and a shoulder at 265 – 268 m$\mu$ and an I.R. spectrum in KBr showing bands at the following wave lengths (in $\mu$) 2.94 – 3.40 – 5.82 – 6.00 – 6.16 – 6.24 – 6.86 – 7.25 – 7.41 – 8.60 – 8.85 – 9.35 – 10.00 – 10.40 – 10.98 – 11.8 – 12.5, or its salts with nontoxic acids.

3. Antibiotic substance axenomycine D, which has the elemental analysis 60.25% C, 7.92% H, 30.35% O, a molecular weight of 1,650, melts from 174° – 175°, a U.V. spectrum in methanol maxima at 250, 255 and 330 m$\mu$ and a shoulder at 265 – 268 m$\mu$, $E_{d\ cm}^{1\%}$ 138 (255 m$\mu$), and an I.R. spectrum in KBr showing bands at 3,440, 2,980, 2,950, 2,890, 1,735, 1,705, 1,675, 1,630, 1,610, 1,465, 1,385, 1,355, 1,290, 1,265, 1,195, 1,170, 1,115, 1,080, 1,050, 1,005, 995, 975, 945, 925, 895, 865, 810, 700 cm$^{-1}$.

4. A microbiological process for the preparation of the antibiotics axenomycine A and B, which comprises cultivating the microorganism *Streptomyces lisandri* n.sp. IMRU 3935 in aerobic conditions in a liquid cultural medium containing a carbon source, a nitrogen source, and a mineral salt source, at a temperature of from 23° to 37°C over a period of time of from 60 to 160 hours at a pH of from 6 to 9, isolating the complex thus obtained from the fermentation and then separating the complex into the two antibiotic components axenomycine A and axenomycine B.

5. A microbiological process for preparing the antibiotic axenomycine D, which comprises cultivating the microorganism *Streptomyces lisandri* n.sp. I.M.R.U. 3935 in aerobic conditions in a nutrient medium containing a source of nitrogen and mineral salts, and a carbon source, said carbon source is at least 10% of said nutrient medium, subjecting the culture to a high stirring and to a high air flux, said air flux being from 0.7 liter to 2 liter per liter of medium per minute, at a temperature of from 23° to 37°C for a period of from 60 to 160 hours and at a pH of 6–9, isolating and separating out the axenomycine D from the culture medium.

* * * * *

UNITED STATES PATENT OFFICE
CERTIFICATE OF CORRECTION

Patent No. 3,853,991          Dated December 10, 1974.

Inventor(s) Ernesto COTTA, Piera JULITA and Aurora SANFILIPPO

It is certified that error appears in the above-identified patent and that said Letters Patent are hereby corrected as shown below:

Title page, left side, inventors' address: "Midland, Italy" should read -- Milan, Italy --.

Column 1, line 17: "lisandri n.s.p.." should read --lisandri n.sp..--.

Columns 3-4, Table 1, footnote No. 3: "Journal or Microbiology" should read -- Journal of Microbiology --.

Column 5, line 14: "adn" should read -- and --; line 55: "61.7% C, 8.52% H, 28.7%" should read -- 61.74% C, 8.52% H, 28.87% --.

Column 7, line 53: "eggLocke" should read -- egg - Locke --; line 65: "Axenomycin A" should read -- Axenomycine A --.

Column 8, lines 30-31: "Axenoncyine D" should read -- Asenomycine D --; line 55: "Corn step liquor" should read -- Corn steep liquor --.

Column 9, line 11: "incuation," should read -- incubation, --; line 57: "2,2 cc" should read -- 2. 2 cc --.

Column 10, line 57: "wich" should read -- which --.

Column 11, line 23: "phosphoric" should read -- phosphoric, --; Column 11, between "Ammonium sulfates" and "Tap water to": should read -- Dipotassium phosphate 0.01% --.

-1-

UNITED STATES PATENT OFFICE
CERTIFICATE OF CORRECTION

Patent No. 3,853,991      Dated December 10, 1975

Inventor(s) Ernesto COTTA, Piera JULITA and Aurora SANFILIPPO

It is certified that error appears in the above-identified patent and that said Letters Patent are hereby corrected as shown below:

Column 13, line 5 of claim 1: "10.50°" should read -- 10.5° --.

Column 13, line 5 of claim 2: "(n.butanol acetic acid:" should read -- (n.butanol:acetic acid: --.

Column 14, line 4 of claim 5: "methanol maxima" should read -- methanol having maxima --.

Signed and sealed this 18th day of March 1975.

(SEAL)
Attest:

RUTH C. MASON
Attesting Officer

C. MARSHALL DANN
Commissioner of Patents
and Trademarks